United States Patent
Zhang

(10) Patent No.: US 11,991,271 B2
(45) Date of Patent: May 21, 2024

(54) SYSTEM AND METHOD FOR QUANTUM RESISTANT PUBLIC KEY ENCRYPTION

(71) Applicant: International Business Machines Corporation, Armonk, NY (US)

(72) Inventor: Wenbin Zhang, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 134 days.

(21) Appl. No.: 16/051,248

(22) Filed: Jul. 31, 2018

(65) Prior Publication Data

US 2020/0044832 A1 Feb. 6, 2020

(51) Int. Cl.
*H04L 9/08* (2006.01)
*H04L 9/06* (2006.01)
*H04L 9/30* (2006.01)

(52) U.S. Cl.
CPC .......... *H04L 9/0825* (2013.01); *H04L 9/0625* (2013.01); *H04L 9/3073* (2013.01); *H04L 9/3093* (2013.01)

(58) Field of Classification Search
None
See application file for complete search history.

(56) References Cited

U.S. PATENT DOCUMENTS

| | | | |
|---|---|---|---|
| 5,263,085 A | 11/1993 | Shamir | |
| 5,375,170 A | 12/1994 | Shamir | |
| 7,158,636 B2 | 1/2007 | Ding | |
| 7,961,876 B2 | 6/2011 | Ding | |
| 2008/0013733 A1 | 1/2008 | Johansson | |
| 2009/0010428 A1 | 1/2009 | Delgosha | |
| 2013/0129090 A1* | 5/2013 | Kipnis | H04L 9/3247 380/255 |
| 2013/0177151 A1 | 7/2013 | Sella et al. | |
| 2015/0280914 A1* | 10/2015 | Yasuda | H04L 9/3093 380/30 |
| 2016/0248586 A1 | 4/2016 | Hughes et al. | |
| 2016/0234021 A1* | 8/2016 | Tang | H04L 9/006 |
| 2016/0261405 A1 | 9/2016 | Chevallier-Mames | |
| 2017/0070348 A1 | 3/2017 | Tang | |
| 2017/0250819 A1* | 8/2017 | Hoffstein | H04L 9/3026 |
| 2017/0358742 A1 | 12/2017 | Govoreanu | |

(Continued)

FOREIGN PATENT DOCUMENTS

| | | |
|---|---|---|
| CN | 101540673 B | 2/2011 |
| CN | 103490883 B | 10/2016 |

(Continued)

OTHER PUBLICATIONS

United States Office Action dated Jun. 16, 2020, in co-pending U.S. Appl. No. 16/051,226.

(Continued)

*Primary Examiner* — Benjamin E Lanier
(74) *Attorney, Agent, or Firm* — Steven M. Bouknight

(57) ABSTRACT

A system, method, computer program product, and service for encrypting a message. A plaintext message to be encrypted is received as input data into a computer. A processor on the computer encrypts the plaintext message, using a public key having two components, each component (Continued)

ENCRYPTION

Split-and-Switch Composition having degree 4. The encrypted version of the input plaintext message is output as a ciphertext having two components, each component having degree 4.

16 Claims, 14 Drawing Sheets

(56) References Cited

U.S. PATENT DOCUMENTS

2018/0091302 A1* 3/2018 Ding .................. H04L 9/3247
2020/0044860 A1 2/2020 Zhang

FOREIGN PATENT DOCUMENTS

| CN | 103457726 B | 12/2016 |
| CN | 103780382 B | 1/2017 |
| CN | 106027262 B | 2/2017 |
| WO | WO 2015/048783 A1 | 4/2015 |
| WO | WO 2016/155565 A1 | 10/2016 |

OTHER PUBLICATIONS

United States Office Action dated Nov. 2, 2020, in co-pending U.S. Appl. No. 16/051,226.
United States Office Action dated Jan. 6, 2022 in U.S. Appl. No. 16/051,226.
Ding et al., "The Cubic Simple Matrix Encryption Scheme", M. Mosca (Ed.): PQCrypto 2014, LNCS 8772, pp. 76-87.
Porras et al., "ZFHE, a New Multivariate Public Key Encryption Scheme", M. Mosca (Ed.): PQCrypto 2014, LNCS 8772, pp. 229-245.
Tao et al., "Simple Matrix Scheme for Encryption", p. Gaborit (Ed.): PQCrypto 2013, LNCS 7932, pp. 231-242.
Barker, "Recommendation for Key Management: Part 1—General", NIST Special Publication 800-57, Part 1, Revision 5, May 2020, §5.6.1, pp. 62-64.
Ding et al., "Rainbow, a New Multivariable Polynomial Signature Scheme", ACNS 2005, LNCS 3531, pp. 164-175, 2005.
Gomez-Perez et al., "Common Composites of Triangular Polynomial Systems and Hash Functions", 2016, Journal of Symbolic Computation 72, pp. 182-195.
Kipnis, "Unbalanced Oil and Vinegar Signature Schemes", Extended Version, Eurocrypt '99, 20 pages.
List of IBM Patents or Patent Applications Treated as Related, Feb. 15, 2024, 2 pages.
Patarin et al., "Quartz, 128-bit long dgital signatures*", *Part of this work is an output of project "Turbo-signatures", supported by the French Ministry of Research, (2001), 16 pages.
Petzoldt et al., "Design Principles for HFEv- Based Multivariate Signature Schemes", International Association for Cryptologic Research 2015, Asiacrypt 2015, Part I, LNCS 9452, pp. 311-334.

* cited by examiner

FIG. 12

| | Plaintext Length | Pub Key Size | Possible Security | Scalability | Decryption Failure |
|---|---|---|---|---|---|
| This Invention (q,n) = (2^32, 4) | 128 – Bit | 4.4 KB | 128 - Bit | Strong (O(q^n)) | No |
| This Invention (q,n) = (2^64, 4) | 256 – Bit | 8.8 KB | 256 - Bit | Strong (O(q^n)) | No |

SYSTEM AND METHOD FOR QUANTUM RESISTANT PUBLIC KEY ENCRYPTION

BACKGROUND

The present invention relates to quantum resistant public key encryption, and more specifically, a new trapdoor design for a multivariate encryption scheme in which the trapdoor has degree 4 and utilizes a new split-and-switch composition mechanism.

SUMMARY

According to an embodiment of the present invention, a new method and system for Quantum Resistant Public Key Encryption is described. A key feature of this method, referred to herein as "Split-and-Switch Composition", describes a method in which the trapdoor in Multivariate Public Key Cryptography (MPKC) has degree greater than 2 and which provides a public key for encrypting an input plaintext into a ciphertext having two components each of degree 4 (the split), with one component having a composition with a map that has been switched from a map used in the other component (the switch).

The new trapdoor includes the definition of the algorithm underlying the split and switch, so that the private key associated with the encrypted plaintext permits the reconstruction of the original plaintext from the two components of the encrypted ciphertext. This new method of public key encryption additionally advantageously provides much smaller key size than conventional MPKC methods as well as providing potentially a strong and scalable security $O(q^n)$.

BRIEF DESCRIPTION OF THE DRAWINGS

FIG. 12 exemplarily shows a comparison of key size using split-and-switch composition;

DETAILED DESCRIPTION

Figure 1:
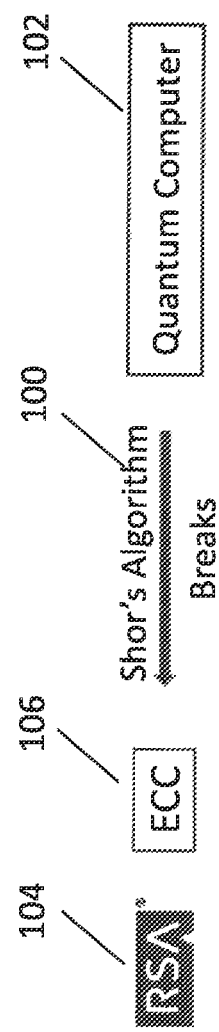
FIG. 1 exemplarily shows in diagrammatic format the problem being addressed by the present invention.

With reference now to FIG. 1, the present invention is directed to an improvement in cryptographic systems which play a fundamental role in applications such as high security business standards, such as RSA 104 or ECC 106, used universally on Internet transactions. ECC (Elliptic-Curve Cryptography) is an approach to public-key cryptography based on the algebraic structure of elliptic curves over finite fields. RSA (Rivest-Shamir-Adleman) is an acronym formed of the initials of the surnames of the three individuals who first publicly described this algorithm in 1978.

RSA is one of the first public-key cryptosystems and is still widely used for secure data transmission. In such a cryptosystem, the encryption key is public and differs from the decryption key which is kept secret (private), thereby being an example of an asymmetric cryptography system as referring to any cryptographic system that uses pairs of keys: public keys which may be disseminated widely, and private keys which are known only to the owner.

The asymmetry of RSA is based on the practical difficulty of the factorization of the product of two large prime numbers. A user of RSA creates and then publishes a public key based on two large prime numbers, along with an auxiliary value. The prime numbers must be kept secret. Anyone can use the public key to encrypt a message, but with currently published methods, and if the public key is large enough, only someone with knowledge of the prime numbers can decode the message feasibly.

As further demonstrated in FIG. 1, the present invention is directed to the problem recognized in cryptography that Shor's algorithm 100, which provides a quantum algorithm (an algorithm that runs on a quantum computer) for factorization, could be used to break public-key cryptography schemes such as the RSA scheme. On a quantum computer 102, to factor an integer N, Shor's algorithm would run in polynomial time, meaning the time taken is polynomial in log N, which is the size of the input. Thus, using fast multiplication with a number of quantum gates of order $O((\log N)^2 (\log \log N)(\log \log \log N))$, the integer factorization problem can be efficiently solved on a quantum computer substantially faster than the most efficient known classical factoring algorithms. Such awareness of the potential of Shor's algorithm has facilitated research on new cryptosystems that are secure from quantum computers, often collectively called post-quantum cryptography. The cryptography community has been actively searching for such algorithms since the early 1990s, and the National Institute of Standards and Technology (NIST) in the United States called for quantum-secure cryptographic algorithms in 2017.

Figure 2:
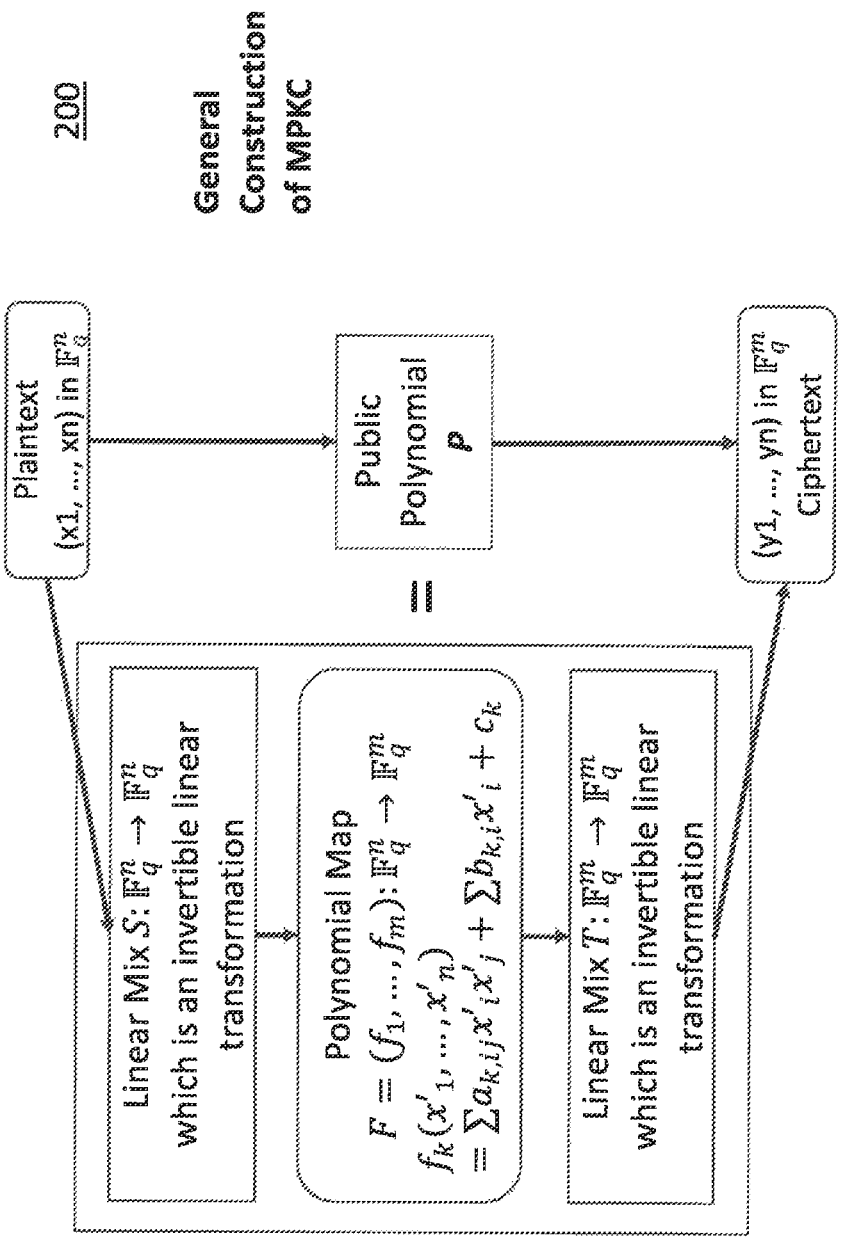
FIG. 2 exemplarily shows a generic format generic MPKC mechanism 200.

FIG. 2 shows a generic MPKC mechanism 200. When MPKC is used for encryption, n<=m and the polynomial map F is an injective function, any two distinct points are mapped to different images. Most existing designs use degree 2 polynomials. Advantages of the MPKC mechanism include very short input, high efficiency, and a security foundation that is backed by an NP-hard problem. However, all designs of MPKC for encryption have failed to date, except designs proposed only in recent several years which require extensive security analysis in the future and have disadvantages including large or even huge key sizes with moderate practical security, weak scalability, and lack of theoretical proof of security.

For purpose of clarity in describing the present invention and as well understood in the art of cryptography, the term "trapdoor" is related to the term "trapdoor function" and is distinguished from the term "backdoor", as follows. A backdoor is a mechanism added to a cryptographic algorithm such as a key pair generation algorithm or digital signing algorithm or to an operation system. A backdoor permits one or more unauthorized parties to somehow bypass or subvert the security of the system.

In contrast, a trapdoor function is a function that is easy to compute in one direction but difficult to compute in the opposite direction without special information, typically referred to as the "trapdoor". Trapdoor functions are widely used in cryptography. Thus, a trapdoor function can be described as a function $f: D \to R$, such that, given x in D, $f(x)$ in R is easy to compute, but the inverse $f(x)^{-1}$ is difficult to compute without knowing the associated trapdoor.

Also, for purpose of this discussion, the term "degree" as used herein refers to the degree of a polynomial function and is the highest degree of its monomials (individual terms) with non-zero coefficients. The degree of a term is the sum of the exponents of the variables that appear in it, and thus is a non-negative integer. For example, the polynomial $4x^2y^3+5x-8$, which can also be expressed as $4x^2y^2+5x-8x^0y^0$ has three terms. The first term has a degree of 5 (the sum of the powers 2 and 3), the second term has a degree of 1, and the last term has a degree of 0. Therefore, the polynomial has a degree of 5, which is the highest degree of any term.

The term "composition", often symbolized with "∘", is understood in the art as referring to a mechanism that combines simple functions to build a more complicated function. Similar to the composition concept in mathematics, when implemented on a computer, the result of each function is passed as the argument of the next, and the result of the last one is the result of the whole composition.

Thus, for example, the functions $f: X \to Y$ and $g: Y \to Z$ can be composed to yield a function which maps x in X to $g(f(x))$ in Z. The resulting composite function is denoted $g \circ f: X \to Z$, defined by $(g \circ f)(x) = g(f(x))$, for all x in X. Relative to the present invention, a composition $g \circ f$ involving multivariate polynomial maps g, will have degree 4, when g, $f$ each has degree 2.

Trapdoor designs of Multivariate Public Key Cryptography (MPKC) are still mainly of degree 2, with a few of degree 3. As recognized by the present inventor and as would be understood in the art, this is due to three main reasons: 1) the key size normally becomes huge when the degree is higher than 2, 2) any higher degree polynomial can be reduced to degree 2 polynomials, and 3) the obvious composition F1∘F2 has been tried in some designs but found to be insecure and there lacks nontrivial approach for such composition. However, degree 2 remains a considerable restriction on the freedom of trapdoor designs, and thus restricts potential in this direction for encryption. The present inventor has recognized that a future direction would be to consider higher degrees, but still small, such as degrees 3 or 4.

Figure 3:
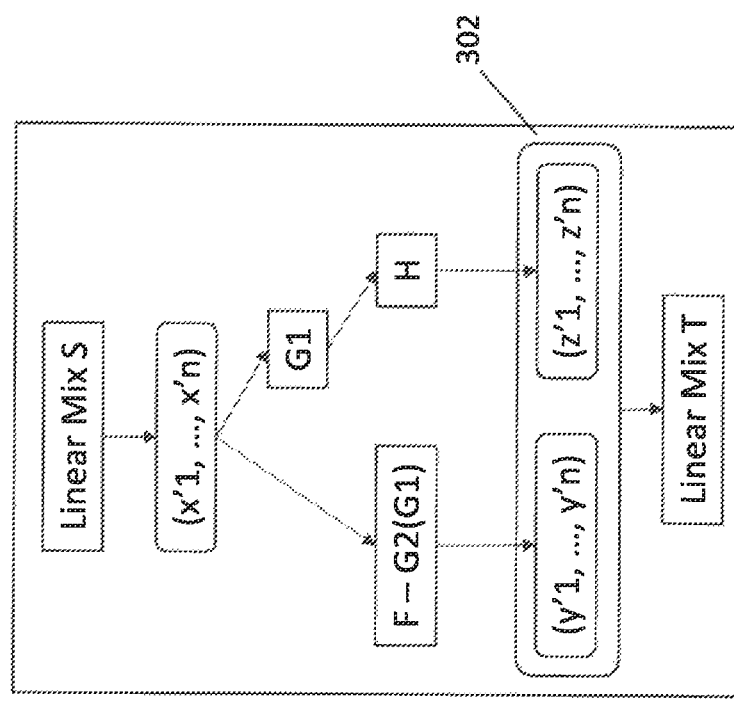
FIG. 3 shows an exemplary embodiment of a new trapdoor design 300 of the present invention, as used in multivariate encryption schemes using the split-and-switch composition mechanism.

As exemplarily shown in FIG. 3, the present invention provides a new trapdoor design 300 for multivariate encryption schemes which is of degree 4 and which embeds a novel trapdoor in the composition, called split-and-switch composition. With this trapdoor, the public polynomial is P: $\mathbb{F}_q^n \to \mathbb{F}_q^{2n}$ $$P(x) = T \circ [F - G_2 \circ G_1, H \circ G_1] \circ S(x) = T[F(S(x)) - G_2(G_1(S(x))), H(G_1(S(x)))]$$

Here $\mathbb{F}_q$ is the finite field of q elements, F: $\mathbb{F}_q^n \to \mathbb{F}_q^n$ is an invertible polynomial of degree 4, $G_1$, $G_2$: $\mathbb{F}_q^n \to \mathbb{F}_q^n$ are random polynomials with degree 2, H: $\mathbb{F}_q^n \to \mathbb{F}_q^n$ is an invertible polynomial with degree 2, S: $\mathbb{F}_q^n \to \mathbb{F}_q^n$ and T: $\mathbb{F}_q^{2n} \to \mathbb{F}_q^{2n}$ are two invertible linear transformation. There are a few classes of degree 4 invertible polynomials known in the art for F to choose, or F can be constructed by composing any two invertible polynomial maps of degree 2. There are a few well known, big enough, classes of invertible multivariate polynomial maps which are of degree 2 and can be inverted efficiently. Any two of them can form a degree 4 map by composition. It is noted that, because of the composition of two polynomial maps of degree 2, the public key will have degree 4.

This trapdoor design 300 has the following three special properties:

It is expected that the central degree 4 polynomial map cannot be decomposed as the composite of two quadratic polynomial maps in general;

Because G1, G2 are random, the two inner branches (F−$G_2 \circ G_1$, and H∘$G_1$) 302 are (mostly) random as well; and G1 is hidden by two quadratic maps G2 and H which have no relationship with each other, so the two branches have no linear relationship.

Figure 4:
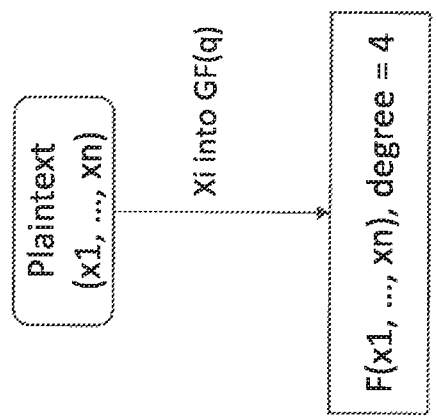
FIG. 4 shows the starting point of the split-and-switch composition, namely an invertible multivariate polynomial map F of degree 4.
Figure 5:
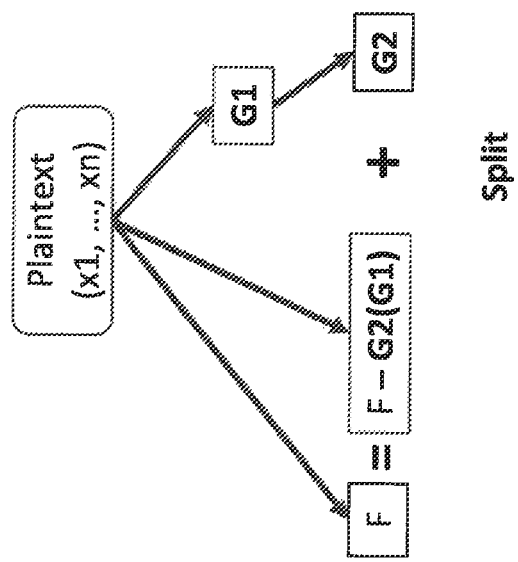
FIG. 5 exemplarily shows the concept of the "split" aspect of the present invention.
Figure 6:
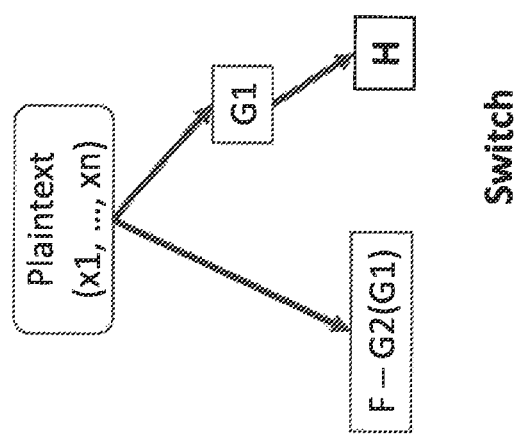
FIG. 6 exemplarily shows the concept of the "switch" aspect of the present invention.

FIG. 4-6 show in detail the concepts underlying the split-and-switch composition utilized in the present invention.

Specifically, FIG. 4 exemplarily shows the starting point of the split-and-switch composition, namely an invertible multivariate polynomial map F of degree 4 which may be constructed as described above.

FIG. 5 shows the concept of the "split" aspect of the present invention. The polynomial F is split into two branches, F−G2(G1) as one branch and the composition G1∘G2 (e.g., G2(G1)) as the other branch. Here G1, G2 are random multivariate polynomial maps, degree 2, so that the composite G1∘G2 has degree 4.

FIG. 6 shows the concept of the "switch" aspect of the invention. Here, H is an invertible multivariate polynomial map of degree 2. Note that G2 in FIG. 5 is switched to H in FIG. 6. Also note that F−G2(G1), previously processed in FIG. 5 participates as part of this switch by reason that it retains the information used in the previous composition G1° G2. Thus, both F−G2(G1) and H ∘G1 in FIG. 6 are of degree 4.

Figure 7:
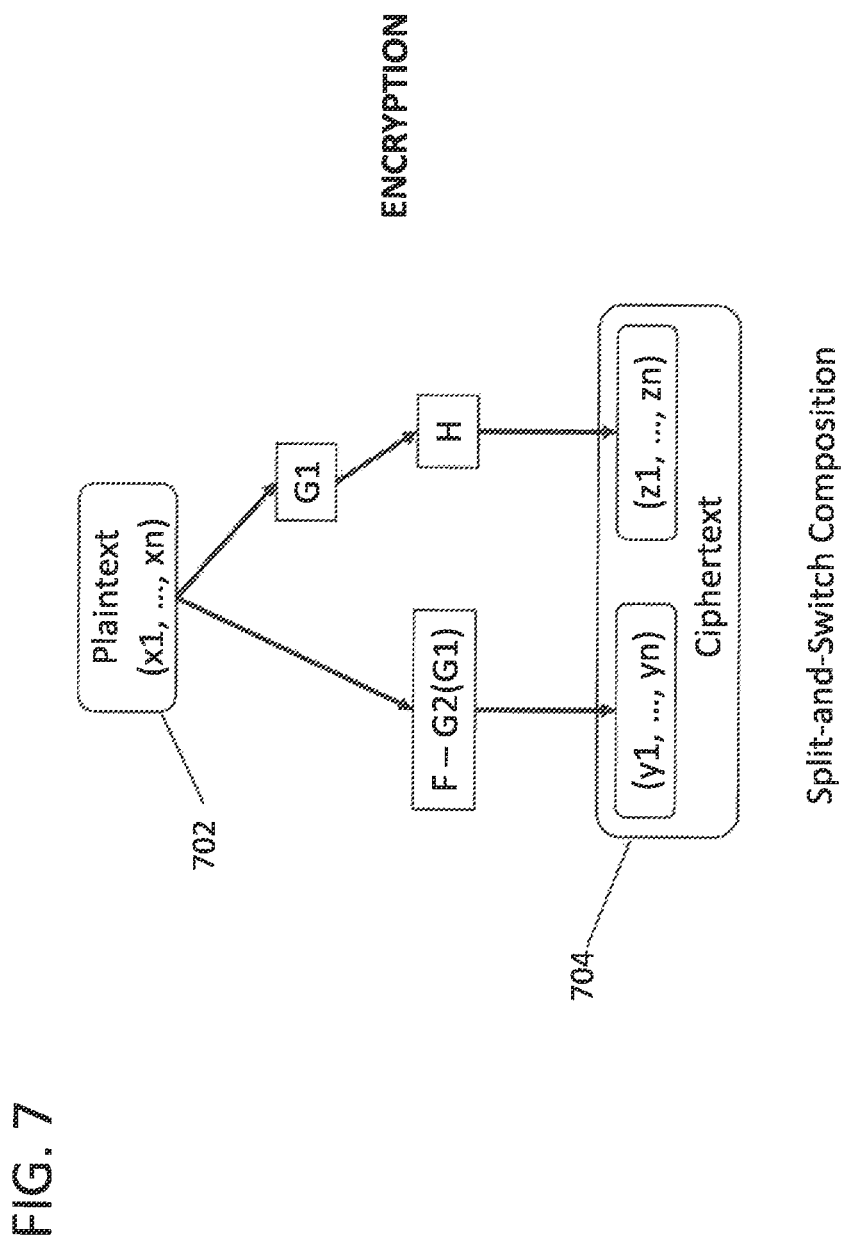
FIG. 7 demonstrates encryption using split-and-switch composition.

FIG. 7 demonstrates encryption using split-and-switch composition by showing how a plaintext $(x_1, \ldots, x_n)$ 802 is provided as an input into the split-and-switch composition to generate a ciphertext 704 having two components $y=(y_1, \ldots, y_n)$, $z=(z_1, \ldots, z_n)$. Here, $x_i$, $y_i$, $z_i$ are in $\mathbb{F}_q$. The two transfer functions of the two ciphertext components are:

$$y=F(x)-G2(G1(x));\text{ and}$$

$$z=H(G1(x)).$$

Figure 8:
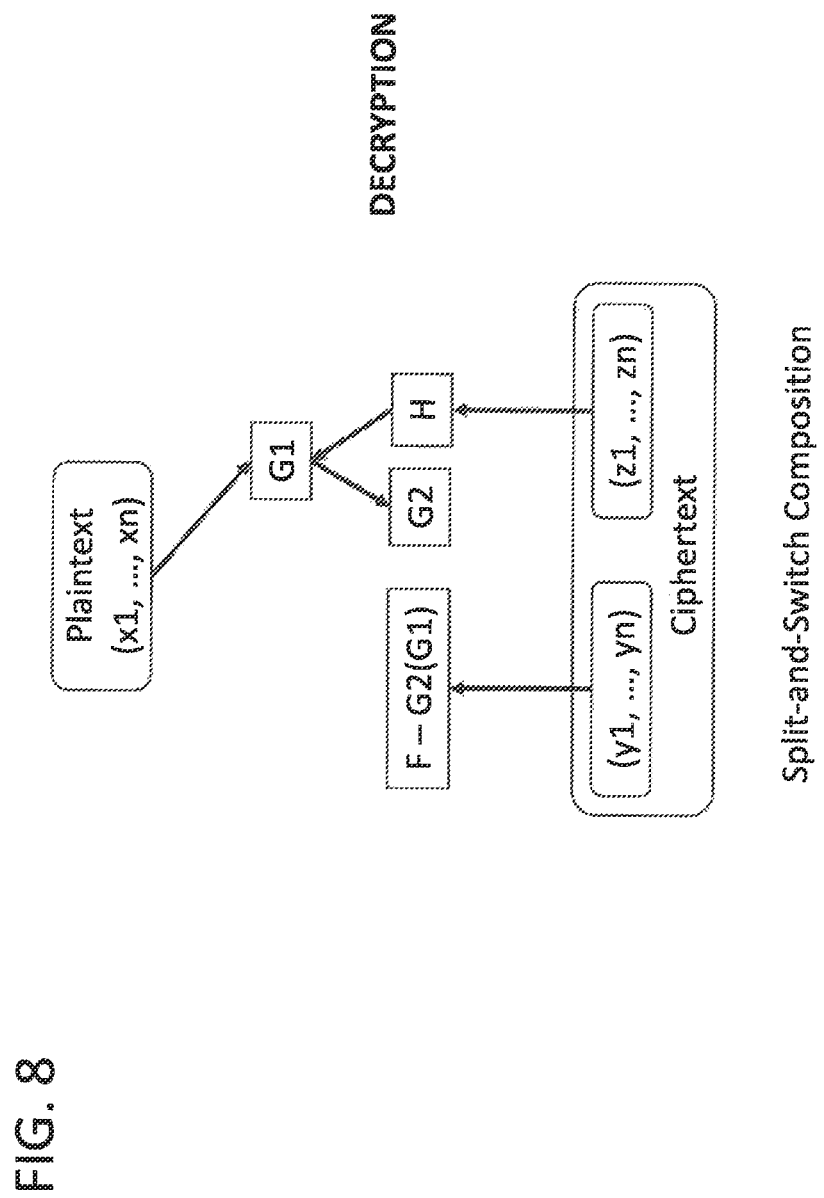
FIG. 8 shows the first stage of decryption using split-and-switch composition.
Figure 9:
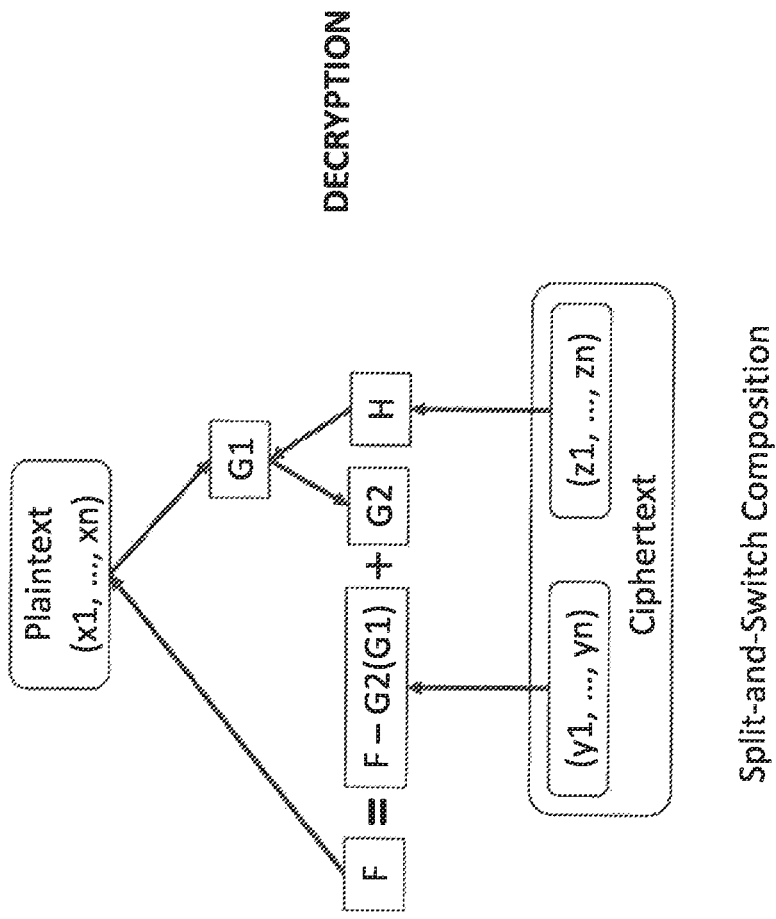
FIG. 9 shows the second stage of decryption using split-and-switch composition.

FIG. 8 and FIG. 9 demonstrate how decryption of the two ciphertext components can be achieved in the trapdoor, since H is invertible (i.e., $H^{-1}$) and:

$$G2(G1(x))=G2(H^{-1}(z));$$

$$F(x)=G2(H^{-1}(z))+y;\text{ and}$$

$$x=F^{-1}(G2(H^{-1}(z))+y).$$

Figure 10:
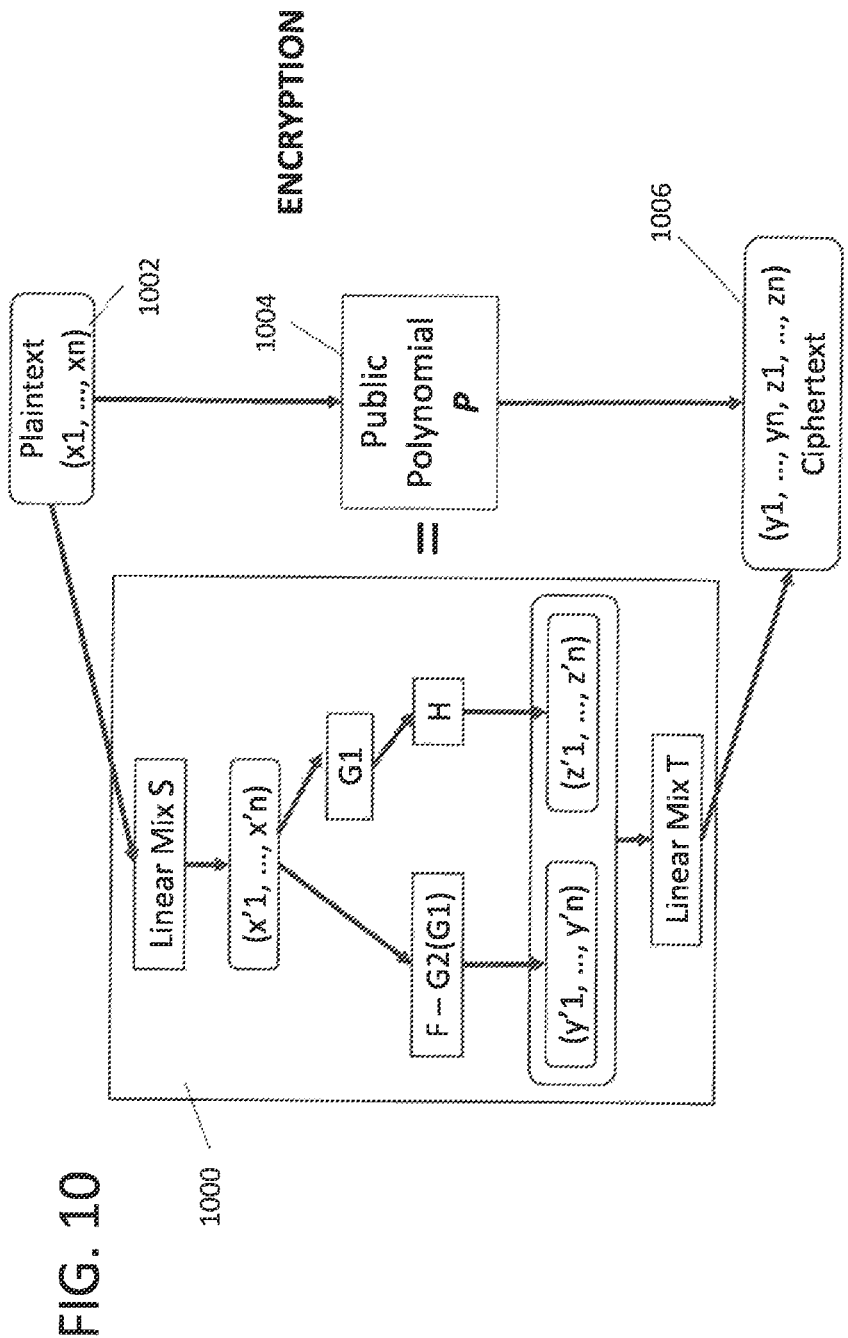
FIG. 10 shows the system design for encryption using a public key (e.g., public polynomial 1004)

FIG. 10 accordingly shows encryption of a system using a trapdoor 1000 of the present invention with public key P 1004. Input plaintext (x1, . . . xn) 1002 is provided as input into public key P 1004 to provide encryption ciphertext 1006 (y1, . . . yn, z1, . . . , zn)=P(x1, . . . , xn). Here, components of the public key P are the coefficients of the polynomial P(x)=T(F(S(x))−G2(G1(S(x))), H(G1(S(x)))), having degree 4. The components of the private key are: the coefficients of F, G1, G2, H; and the invertible linear matrices S, T.

A small key size can result in the present invention by using a big field and small dimensions. For example, with $q=2^{32}$, $n=4$, public key size is 4.4 KB.

Figure 11:
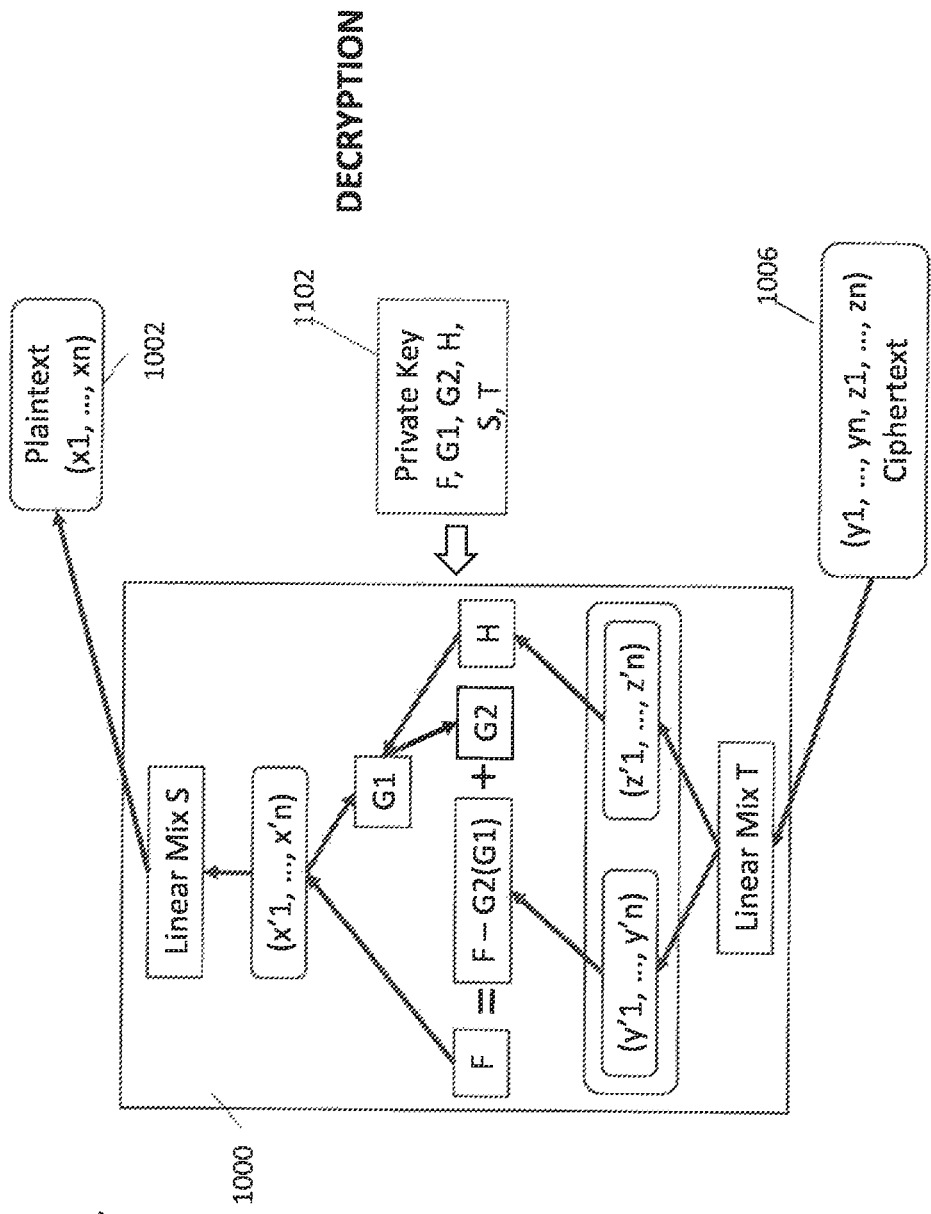
FIG. 11 shows the system design for decryption using private key 1102 and the trapdoor 1000.

FIG. 11 shows the decryption of the encrypted ciphertext 1006 of FIG. 10, using private key 1102 and the trapdoor 1000. Here components of the private key 1102 are: the coefficients of F, G1, G2, H; and the invertible linear matrices S, T. Here, the decryption processing is:

$$(y',z')=T^{-1}(y,z);$$

$$x'=F^{-1}(G2(H^{-1}(z'))+y');\text{ and}$$

$$x=S^{-1}(x').$$

Further, as demonstrated in FIG. 12, the trapdoor mechanism of exemplary embodiments 1200 of the present invention, which provide exemplary encryption mechanisms using an original split-and-switch composition mechanism, is expected to provide a practical algorithm of degree>2 for MPKC. That is, as shown in FIG. 12, the present invention provides a degree−4 encryption/decryption mechanism in which the public key size 1202 is much smaller than conventional methods. The split-and-switch composition mechanism also provides stronger security 1204, stronger scalability 1206, and no decryption failure 1208.

It would also be understood by one of ordinary skill that although this disclosure includes a detailed description on cloud computing, as follows, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 13:
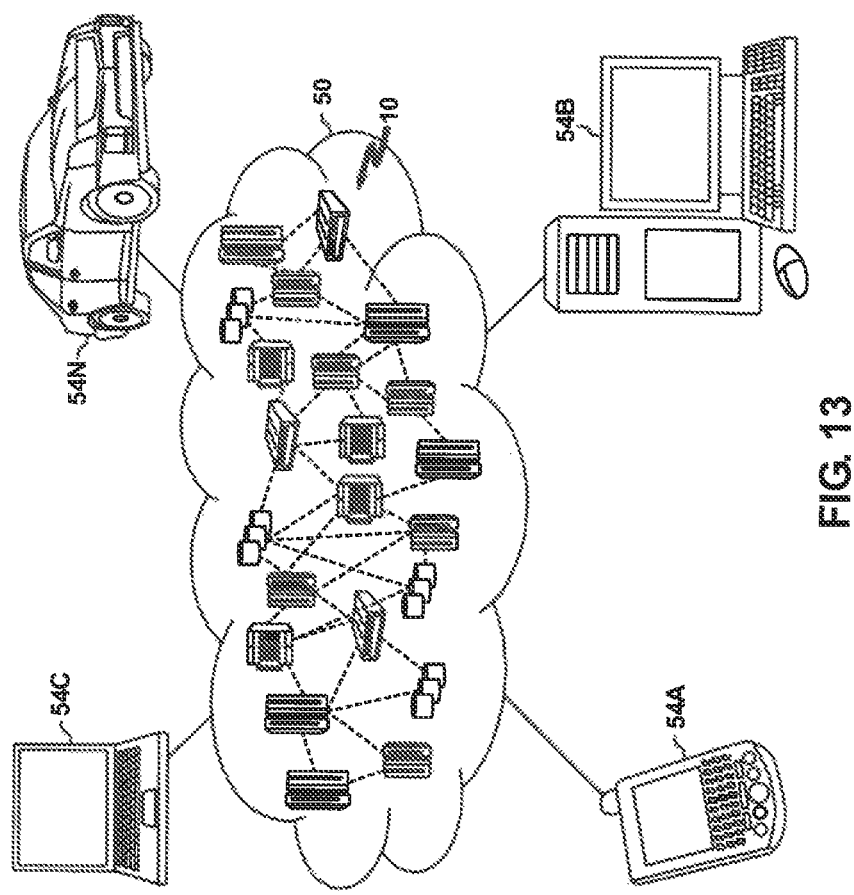
FIG. 13 depicts a cloud computing environment according to an embodiment of the present invention.

Referring now to FIG. 13, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 13 are intended to be illustrative only and that computing nodes 10 and cloud computing environment 50 can communicate with any type of computerized device over any type of network and/or network addressable connection (e.g., using a web browser).

Figure 14:
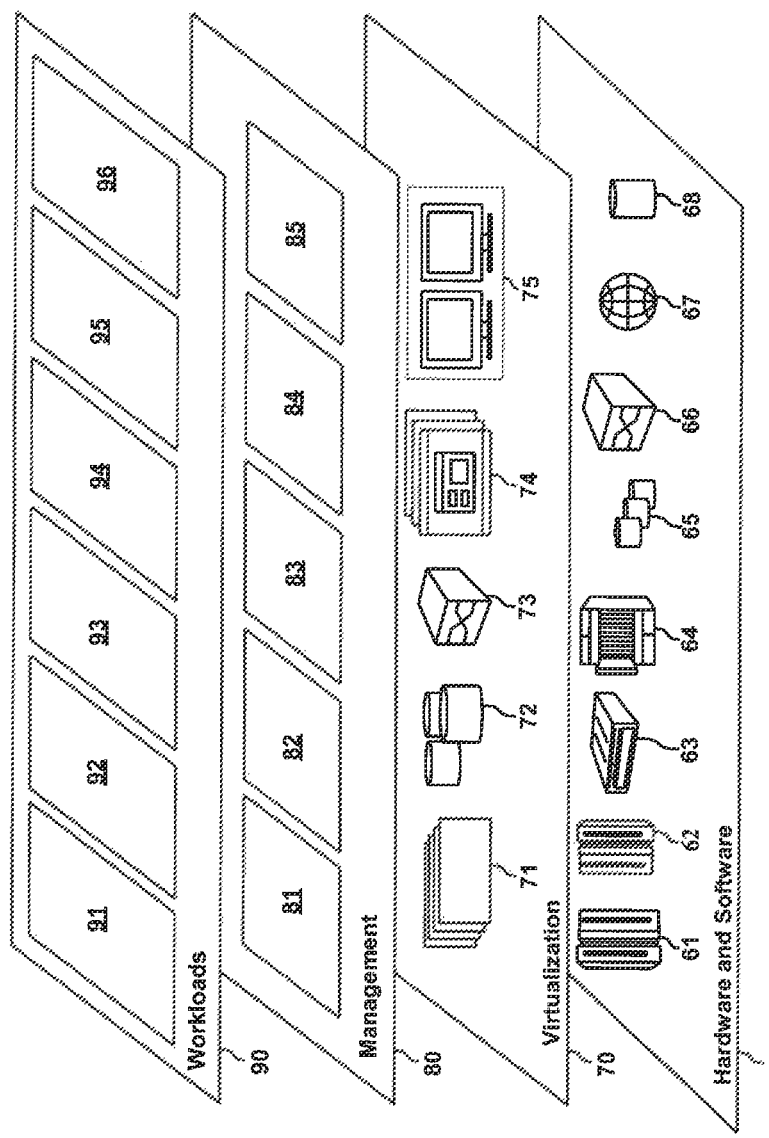
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and trapdoor 96 of the present invention, including associated functions to implement the trapdoor as described herein.

However, it should be clear to one of ordinary skill in the art that the concepts of the present invention can be implemented without using a cloud service. For example, the trapdoor and associated mechanisms of the present invention, as described herein, could be stored on a server located on the Internet such that users would access the server to receive a public key and/or transmit a plaintext message to the server for encryption, possibly using a first secure channel. The server would then encrypt the plaintext message and transmit it to a second user designated by the first user. The server would then also transmit, using a third secure channel, a private key to the second user who has received the encrypted plaintext message that was encrypted using the public key. The server would then use a third secure channel to receive from the second user the private key and the received encrypted plaintext message and would then decrypt the received encrypted plaintext message, using the private key, and then send the decrypted version of the plaintext to the second user, using a fourth secure channel.

The present invention provides enhanced security for asymmetrical cryptography even in view of potential attacks from upcoming quantum computing capabilities, as follows.

First, there are two key points in the design of the public polynomial $$P(x)=T[F(S(x))-G_2(G_1(S(x))),H(G_1(S(x)))].$$

A first key point is that, because both $G_1$, $G_2$ are random, each of the two inner branches $F-G_2(G_1)$ and $H(G_1)$, also referred herein as components, is random as well. A second key point is that, $G_1$ is hidden by two quadratic maps $G_2$ and H, which have no relationship with each other. So these two branches have no linear relationship, and thus no linear transformation can remove any part of them.

Second, the design of the present invention has several layers of protection that are interrelated, as follows.

A first layer of protection is that the secret T (which, it is noted, is a component of the private key) hides the composition structure of the two branches $(F(S(x))-G_2(G_1(S(x))), H(G_1(S(x))))$.

A second layer of protection is that the two secret quadratic maps H, $G_1$ are hidden in the composite $H(G_1)$.

A third layer of protection is that the secret random quadratic map $G_2$ and the secret degree-4 map F are hidden in $F-G_2(G_1)$.

A fourth layer of protection is that the secret S further hides the structure of the two inner branches $(F-G_2(G_1), H(G_1))$.

Existing conventional attacking methods are not applicable against the present invention, as follows:

Direct attacks (especially Groebner-based attacks) are not applicable because, due to the two key points identified above, solving $P(x)=y$ directly is the same as solving a random polynomial equation system of degree at least 2, which is NP-hard.

Linearization attacks are not applicable against the present invention since there is no linear relationship between x and y because $G_1$, $G_2$ are random quadratic maps.

Rank attacks are not applicable because the notion of rank is only applicable to quadratic maps, but in the present invention P is of degree 4 and there is not such rank.

Differential attacks are also not applicable because the differential of a quadratic map is a linear map and may have some differential invariants in some cases, but such invariants can be easily destroyed by adding enough randomness. However, because P(x) is of degree 4 and its differential is of degree 3, which cannot be reduced further by applying the differential again, such differential attacks do not apply against the present invention. In addition, the two random quadratic maps G1, G2 would destroy possible differential invariants, if any.

Accordingly, in view of these security enhancements, again, the present invention notes that existing designs of MPKC for encryption focus on degree two only, thereby restricting their potential in resisting decryption failure by quantum computing. As previously explained, the crypto community has been actively searching since the early 1990's for quantum-secure cryptographic algorithms, and the present invention provides a solution for this ongoing problem in cryptography.

Therefore, although the present invention is arguably based on one or more abstract concepts, the description herein clearly describes that these underlying concepts define a combination of elements that provide a solution to a technical problem in security for encryption/decryption, thereby providing a specific solution to a real-world problem. By defining a specific method for an asymmetric cryptographic system based on degree 4, the claims below clearly describe more than a generic implementation of the abstract idea of an asymmetric cryptographic system on a generic computer. By providing a new method for asymmetrical encryption based on the specific method of split-and-switch composition, the present invention utilizes these underlying concepts as defining at least one inventive concept that distinguishes from the abstract idea of asymmetrical cryptography. To the present inventor's knowledge, this split-and-switch composition concept has never been used in any application, let alone in an asymmetrical cryptographic system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    receiving a plaintext message to be encrypted as input data into a computer in accordance with protocols of an asymmetric cryptography system;
    encrypting the plaintext message, using a processor on the computer and a public key comprising two components, each component presenting a polynomial mapping of degree 4; and
    outputting a ciphertext as an encrypted version of the input plaintext message, the ciphertext comprising the two components, each component having at least degree 4; and
    executing a split-and-switch mechanism that provides an encryption of the plaintext message received as the input data, including a ciphertext message as an encrypted version of the plaintext,
    wherein the ciphertext message derives from a splitting in which the encryption comprises a plurality of components to provide a trapdoor including a random variable, and
    wherein each of the two components of the public key comprises coefficients of a polynomial defining a composition of two mapping functions, each mapping function having at least a degree 2,
    further comprising a split-and-wise mechanism that provides the encryption of the plaintext message received as the input data by providing the ciphertext message as the encrypted version of the plaintext, wherein the ciphertext message derives from the splitting in which the encryption comprises the plurality of components to provide the trapdoor that defines the split-and-switch mechanism,
    wherein the trapdoor includes the two components, comprising at least two random multivariate polynomial maps with one of the at least two random multivariate polynomial maps being hidden.

2. The method of claim 1, as comprising the split-and-switch mechanism that provides the encryption of the plaintext message received as the input data by providing the ciphertext message as the encrypted version of the plaintext, wherein the ciphertext message derives from the splitting in which the encryption comprises the two components, comprising:
    a first component comprising the plaintext message encrypted by a first composition using two mapping functions of degree 2, thereby the first component has degree 4; and
    a second component comprising the plaintext message encrypted by a second composition using two mapping functions of degree 2, thereby the second component also has degree 4, and
    wherein the second composition uses a composition component that is switched from one of the composition components used in the first component.

3. The method of claim 1, wherein the two components together define a split-and-switch composition comprising:
    an invertible multivariate polynomial map F of degree 4;
    two random multivariate polynomial maps G1, G2 of degree 2; and
    an invertible multivariate polynomial map H of degree 2.

4. The method of claim 3, further comprising:
    receiving the ciphertext of the encrypted plaintext message as the input data into the trapdoor that defines the split-and-switch composition, to decrypt the split-and-switch composition of the received ciphertext;
    executing the trapdoor to decrypt the received ciphertext; and
    outputting the decrypted ciphertext as a decrypted plaintext message.

5. The method of claim 4, further comprising receiving as the input data a private key associated with the trapdoor, the private key comprising:
   coefficients of the polynomial maps F, G1, G2, and H; and components of two invertible linear matrices S and T,
   wherein matrix S defines a linear input function into the trapdoor and T defines a linear output function of the trapdoor, and
   wherein the decrypted ciphertext is output to a same source from which was received the private key as the input data.

6. The method of claim 5, wherein:
   the public key is received by a first computer via a communication channel with a second computer, the second computer comprising a server on a network, the server thereby executing the trapdoor to decrypt the split-and-switch composition of the received ciphertext, and
   the private key is received as the input data from a third computer, the third computer having received the private key via a secure channel from the server.

7. The method of 1, as implemented in a cloud service,
   wherein the providing the split-and-switch mechanism provides the plaintext message received as the input data by providing the ciphertext message as the encrypted version of the plaintext message,
   wherein the split-and-switch mechanism includes the trapdoor with the at least two components,
   wherein each of the two components of the public key comprises the coefficients of the polynomial defining the composition of the plurality of mapping functions, and
   wherein the providing the split-and-switch mechanism provides the plaintext message by providing the ciphertext message after the encryption of the plaintext message,
   wherein the public key is quantum resistance.

8. An apparatus, comprising:
   at least one processor; and
   a memory device storing instructions permitting the processor to execute a trapdoor for an asymmetric cryptography system, the trapdoor comprising instructions embodied in the memory device to implement a split-and-switch composition mechanism providing encryption and decryption using polynomial mappings with degree 4,
   wherein the processor outputs a ciphertext as the encrypted version of an input plaintext message, the ciphertext comprising two components, each component having degree 4, and
   wherein the split-and-switch mechanism provides an encryption of a message received as input data by providing a ciphertext message as an encrypted version of the message to provide a trapdoor to the composition, wherein the ciphertext message derives from a splitting during the encryption into two components comprising,
      a first component comprising the plaintext message encrypted by a first composition using two mapping functions of degree 2, thereby the first component has degree 4; and
      a second component comprising the plaintext message encrypted by a second composition using two mapping functions of degree 2, thereby the second component has degree 4, wherein the second composition uses a composition component that is switched from one of the composition components used in the first component,
   wherein each of the two components of the public key comprises coefficients of a polynomial defining a composition of two mapping functions, each of the two mapping functions having at least a degree 2.

9. The apparatus of claim 8, wherein the trapdoor provides the public key comprising the two components of polynomial mappings, each component having degree 4, for use to encrypt plaintext messages into the ciphertext message having the two components, each having degree 4, in accordance with the split-and-switch composition mechanism defined by the trapdoor,
   wherein the split-and-switch mechanism provides the input plaintext message received as the input data by providing the ciphertext message as the encrypted version of the input plaintext message, and
   as comprising the split-and-switch mechanism that provides the encryption of the plaintext message received as the input data by providing the ciphertext message as the encrypted version of the plaintext, wherein the ciphertext message derives from the splitting in which the encryption comprises two components.

10. The apparatus of claim 9, wherein each of the two components of the public key comprises coefficients of the polynomial defining the composition of two mapping functions, each mapping function having degree of at least 2, and the two components together define aspects of the split-and-switch composition mechanism having degree of at least 4 such that the plaintext message encrypted by the public key can be decrypted using the split-and-switch composition mechanism defined in the trapdoor, and
   wherein the ciphertext message derives from the splitting in which the encryption comprises a plurality of different components to provide the trapdoor.

11. The apparatus of claim 10, wherein the two components of the public key together define the aspects of the split-and-switch composition mechanism by comprising:
   an invertible multivariate polynomial map F of degree 4;
   two random multivariate polynomial maps G1, G2 of degree 2; and
   an invertible multivariate polynomial map H of degree 2.

12. The apparatus of claim 8, wherein the trapdoor further provides a private key to a user intended to receive a ciphertext message being a plaintext message encrypted by the public key associated with the split-and-switch mechanism, also via a second secure communication channel, the private key comprising:
   coefficients of polynomial maps F, G1, G2, and H used to define the split-and-switch composition mechanism; and
   components of two invertible linear matrices S and T,
   wherein matrix S defines a linear input function into the trapdoor and T defines a linear output function of the trapdoor.

13. The apparatus of claim 12, wherein the trapdoor further: receives as first input data the private key from a user that has received the ciphertext message; receives as second input data the ciphertext message received from the user; decrypts the ciphertext message, using the received private key, in accordance with a definition of the split-and-switch mechanism stored in the trapdoor; and transmits a decrypted ciphertext message to the user sending the private key to the apparatus, using a secured channel.

14. A computer program product embodied on a non-transitory memory device:
wherein the non-transitory memory device comprises computer-readable instructions that define a trapdoor for an asymmetric cryptography system by implementing polynomial mapping functions of at least degree 4 and executing a split-and-switch composition mechanism of a public key, wherein the split-and-switch composition mechanism provides an encryption of the plaintext message received as input data by providing a ciphertext message as an encrypted version of the plaintext, wherein the ciphertext message derives from a splitting in which the encryption comprises two components, comprising:
a first component comprising the plaintext message encrypted by a first composition using two mapping functions of degree 2, thereby the first component has degree 4; and
a second component comprising the plaintext message encrypted by a second composition using two mapping functions of degree 2, thereby the second component also has degree 4, and wherein the second composition uses a composition component that is switched from one of the composition components used in the first component, and
wherein each of a plurality of components of the public key comprises coefficients of a polynomial defining a composition of a plurality of mapping functions.

15. The computer program product of claim 14, wherein:
the trapdoor provides the public key comprising the two components of polynomial mappings, each component having degree 4, for use to encrypt plaintext messages into the ciphertext message having two components, each having degree 4, in accordance with the split-and-switch composition mechanism defined by the trapdoor, wherein each of the two components of the public key comprises the coefficients of the polynomial defining the composition of two mapping functions, each mapping function having degree 2, and the two components together define aspects of the split-and-switch composition mechanism having degree 4 such that the plaintext message encrypted by the public key can be decrypted using the split-and-switch mechanism defined in the trapdoor, and
the two components of the public key together define the aspects of the split-and-switch composition mechanism by comprising:
an invertible multivariate polynomial map F of degree 4;
two random multivariate polynomial maps G1, G2 of degree 2; and
an invertible multivariate polynomial map H of degree 2
wherein the two components together define the split-and-switch mechanism.

16. The computer program product of claim 14, wherein the trapdoor further provides a private key to a user intended to receive the ciphertext message being the plaintext message encrypted by the public key associated with the split-and-switch composition mechanism, also via a second secure communication channel, the private key comprising:
coefficients of polynomial maps F, G1, G2, and H used to define the split-and-switch composition mechanism; and
components of two invertible linear matrices S and T,
wherein matrix S defines a linear input function into the trapdoor and T defines a linear output function of the trapdoor, and
wherein each of the two components of the public key comprises the coefficients of the polynomial defining the composition of the plurality of mapping functions.

* * * * *